United States Patent [19]

Saunders

[11] Patent Number: 5,267,368
[45] Date of Patent: Dec. 7, 1993

[54] CLOSURE CURTAIN FOR AIRCRAFT PASSENGER BOARDING BRIDGE CAB

[75] Inventor: Robert L. Saunders, Ogden, Utah

[73] Assignee: Blue Mountain Ventures, Salt Lake City, Utah

[21] Appl. No.: 950,274

[22] Filed: Sep. 24, 1992

[51] Int. Cl.⁵ .............................................. B65G 69/24
[52] U.S. Cl. ........................................ 14/71.5; 135/103
[58] Field of Search ................. 14/69.5, 71.5; 135/102, 135/103, 104, 106, 109, 111, 112, 113, 906

[56] References Cited

U.S. PATENT DOCUMENTS

| | | | |
|---|---|---|---|
| 3,639,934 | 2/1972 | Eggert, Jr. | 14/71.5 |
| 3,641,604 | 2/1972 | Eggert, Jr. | 14/71.5 |
| 3,644,952 | 2/1972 | Hatch | 14/71.5 |
| 3,816,867 | 6/1974 | Shirzad et al. | 14/71.5 |
| 4,112,958 | 9/1978 | Anderberg | 14/71.5 |
| 4,120,067 | 10/1978 | Hone et al. | 14/71.5 |
| 4,984,321 | 1/1991 | Larson | 14/71.5 |

Primary Examiner—Timothy V. Eley
Attorney, Agent, or Firm—Thomas S. Baker, Jr.

[57] ABSTRACT

A closure for a cab forming a longitudinally extending passageway that connects a passenger loading bridge to a doorway formed in the fuselage of an aircraft has a curtain with sleeves formed on the outer surface thereof which receive spaced pairs of vertical support members and horizontal support members which connect the outer ends of the vertical support members such that the curtain is suspended from the horizontal support members between the pairs of vertical support members.

33 Claims, 5 Drawing Sheets

CLOSURE CURTAIN FOR AIRCRAFT PASSENGER BOARDING BRIDGE CAB

BACKGROUND OF THE INVENTION

Aircraft passenger boarding bridges provide a weatherproof enclosure for passengers moving between an airport terminal building and the doorway of an aircraft. Typically the inner end of the bridge communicates with the airport terminal building and the outer end of the bridge provides a cab having a closure curtain adapted to engage an aircraft and form a weather tight seal therewith.

Inasmuch as the exterior surfaces of aircraft fuselages are convex in shape at the passenger doorways thereof, the outer ends of the closure curtains must be sufficiently flexible to conform to the exterior aircraft surface. An example of an aircraft closure curtain having a flexible forward end adapted to engage the convex surface of an aircraft surrounding a doorway may be seen in U.S. Pat. No. 3,644,952 to Hatch.

Typical aircraft closure curtains include a support frame, fabric mounted on the frame, resilient pads at the end of the curtain adapted to engage the aircraft and an actuator mechanism which moves the closure curtain towards and away from an aircraft doorway. In this structure the resilient pads and the fabric are wear items which must be replaced periodically as part of the maintenance of an aircraft passenger boarding bridge. Conventionally, the fabric portion of an aircraft closure curtain is installed in the field subsequent to the frame being mounted on the cab of a bridge. In most instances the closure curtain frame is affixed to the bridge cab at the factory. This requires the curtain fabric to be lifted above the frame, unfolded, positioned and secured to the frame from a distance of between 12 and 20 feet in the air. The positive restraint straps or safety straps that contain the movement of the curtain must be removed to allow access to the top horizontal frame components. This requires the frame to be otherwise spaced and supported during removal and/or installation of the fabric. During this procedure the fabric joints undergo stresses much higher than those experienced during operation. It has been found the premature failure of fabric curtain joints are directly attributed to stresses occurred during installation. Additionally, integrating the frame with the bridge cab structure makes shipping the structure bulky and cumbersome.

Thus, it is desirable to provide an aircraft closure curtain that does not require the frame to be preassembled to the aircraft passenger boarding bridge and the curtain to be installed with the frame in place on the bridge. It has been found desirable to provide an aircraft closure curtain having a frame and fabric subassembly that may be shipped and installed as an integral unit.

It also has been found desirable to provide an aircraft closure curtain having horizontal frame components which may be detached from vertical frame components. This provides for ease of curtain replacement and allows the vertical frame components to be folded parallel with the horizontal frame components with the curtain installed to provide a compact shipping package.

SUMMARY OF THE INVENTION

A closure for a cab forming a longitudinally extending passageway that connects a passenger loading bridge to a doorway formed in the fuselage of an aircraft is movable between a retracted position in which the outer end of the closure is moved towards the bridge and an extended position in which the outer end of the closure is moved away from the bridge and has a positive curvature which substantially complements that of the fuselage of an adjacent aircraft. The closure has a support plate with a pair of laterally spaced side walls, a plurality of longitudinally spaced pairs of rigid vertical support members having inner and outer ends, a pair of segmented vertical support members positioned one on each side of the support plate with each of the segmented vertical support members having an inner segment pivotally connected to an outer segment. A pair of longitudinally flexible vertical pad supports having inner and outer ends are positioned one on each side of the support plates. A pivot means pivotally connects the inner ends of the rigid vertical support members to the side walls. A first connecting means connects the inner ends of the vertical pad supports to the support plate and a second connecting means connects the inner ends of the inner segments to the side walls. The vertical pad supports are positioned at the aircraft end of the support plate and the segmented vertical support members are positioned intermediate the rigid vertical support members and the pad supports. A plurality of rigid horizontal support members extend between the outer ends of the rigid pairs of vertical support members and the outer ends of the outer segments. An attachment means attaches the ends of the horizontal support members to the outer ends of the rigid vertical support members in the ends of the outer segments. A longitudinally flexible horizontal pad support extends between the outer ends of the vertical pad supports. A curtain having an inner side surface and an outer side surface has a plurality of longitudinally spaced laterally extending sleeves formed on the outer surface adapted to receive the pairs of rigid and segmented vertical support members and the horizontal support members to cause the curtain to be suspended from the horizontal support members between the pairs of rigid and segmented vertical support members. A first fastening means fastens the curtain to the vertical pad supports and a second fastening means fastens the curtains to the horizontal pad support.

DESCRIPTION OF THE PREFERRED EMBODIMENT

Figure 1:
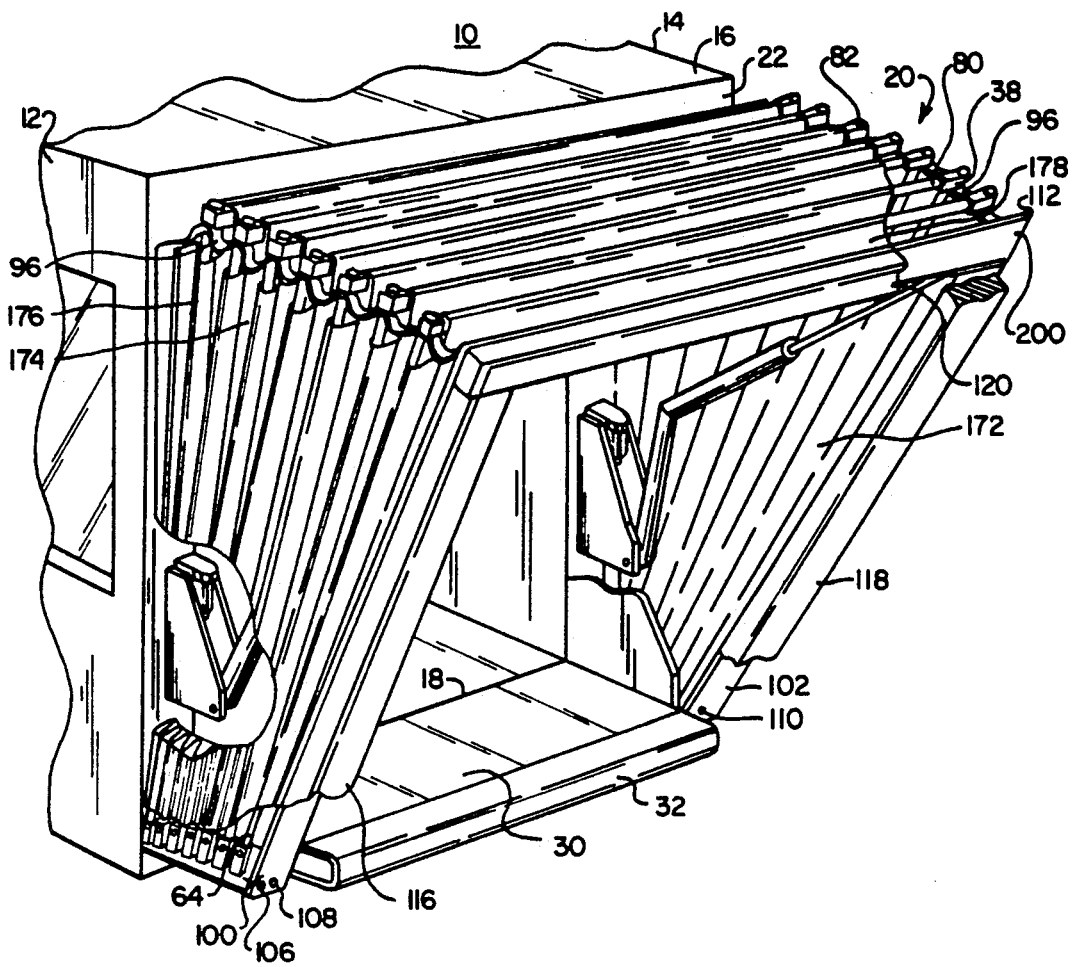
FIG. 1 is a perspective view of the closure according to the subject invention.
Figure 2:
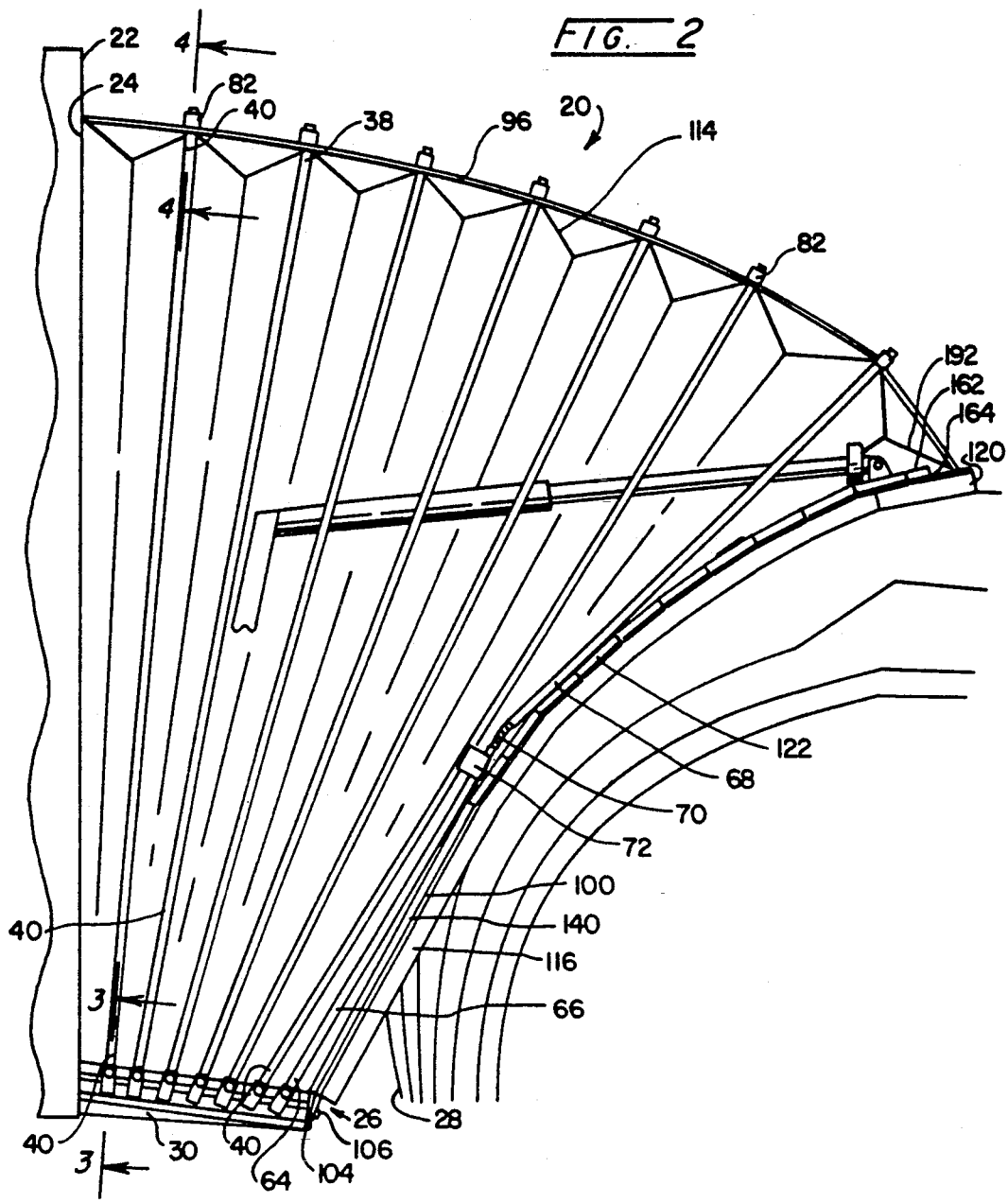
FIG. 2 is a side view of the closure with the fabric removed to illustrate the vertical support members and an actuator.
Figure 3:
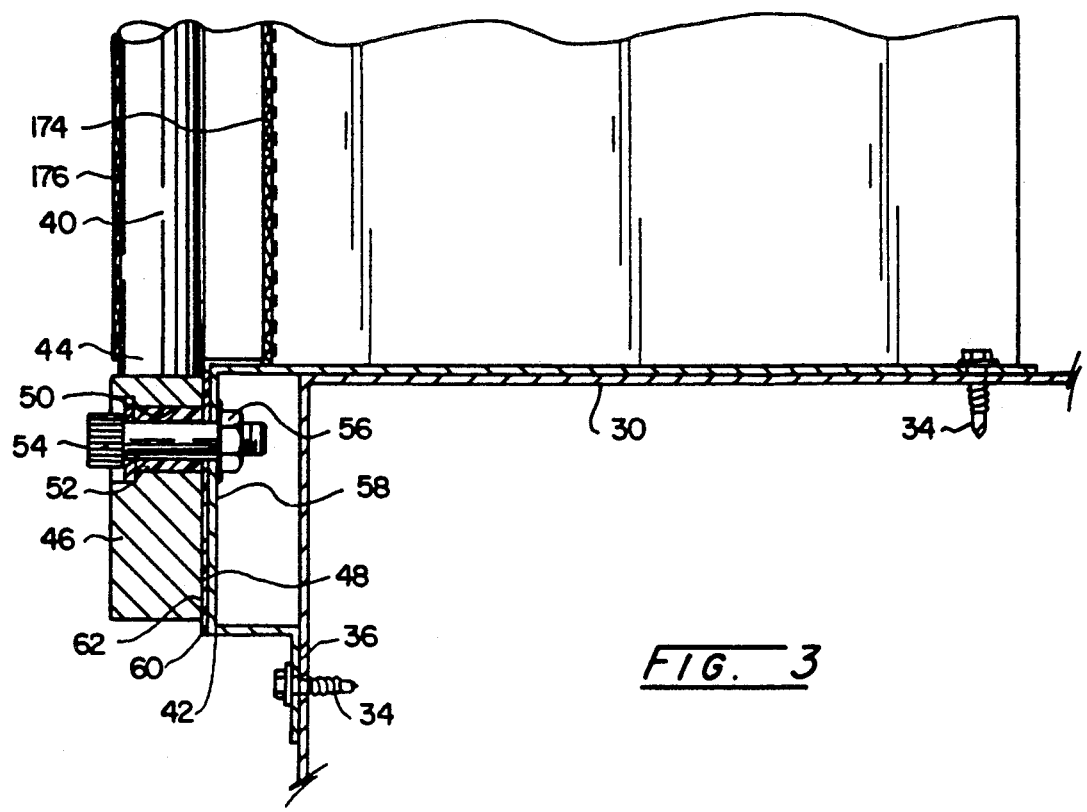
FIG. 3 is a partial sectional view through one side of the support plate.

Turning to FIGS. 1 and 2 of the drawings, a cab (10) mounted at the outer end of an aircraft passenger boarding bridge connected to an airport terminal building (not shown) has a passenger walkway defined by a pair of side walls (12 and 14), a roof (16) and a floor (18). The passenger walkway opens into a closure assembly (20) mounted on the outer end (22) of the cab (10) which provides an interface between the cab (10) and the doorway of an aircraft. It may be observed that whereas the inner end (24) of closure assembly (20) is fixedly attached to the outer end (22) of cab (10), the outer end (26) must be sufficiently movable and flexible to conform to the generally convex curvature of an aircraft fuselage (28) in the area surrounding the aircraft passenger doorway. Closure assembly (20) has a support plate (30) which aligns with the cab floor (18) at its inner end and aligns with the mounting edge of an aircraft engaging bumper (32) at its outer end. Turning to FIG. 3, it may be observed that support plate (30) is bolted by a plurality of fasteners (34) to an inner cab frame member (36). Support plate (30) supports the frame and curtain of the closure assembly (20) and passes the weight of these members to the inner cab frame member (36).

The frame (38) of closure assembly (20) includes numerous vertical and horizontal support members which now will be described. Frame (38) includes a plurality of one piece, rigid, vertical support tubes (40) pivotally mounted at spaced locations along vertical side walls (42) of support plate (30). In the embodiment described herein, six rigid vertical support tubes (40) are pivotally mounted along each side (42) of support plate (30). However, a greater or lesser number of vertical support tubes (40) may be used depending upon the aircraft to be serviced by the bridge to which the cab (10) has been affixed. Details of the pivotal attachment of the vertical support tubes (40) to the support plate (30) may be seen by referring to FIG. 3. The inner end (44) of vertical support tube (40) is rigidly affixed to a pivot block (46) having a smooth flat inner side wall (48) and a horizontal bore (50). A bushing (52) preferably made of plastic or other nonmetallic material is mounted within bore (50) to prevent corrosion at the pivot joint caused by the electrolysis action of dissimilar metals. A threaded fastener (54) passes through an opening in bushing (52) and threadably engages a nut (56) which may be welded to the back side (58) of support plate side wall (42). Fastener (54) acts as a non-clamping fastener meaning that pivot block (46) is free to rotate about the axis of fastener (54). Each of the aforementioned six vertical support tubes (40) on each side of support plate (30) is pivotally mounted to the support plate side wall (42) in the same manner. It should be observed that each of the pivot blocks (46) are of sufficient width and thickness to ensure that while the vertical support tubes (40) may pivot freely about the horizontal axis of their respective fasteners (54) they are restrained from any vertical, lateral or longitudinal displacement with respect to the support plate (30).

In order to facilitate the pivotal movement of the pivot blocks (46), it has been found desirable to attach a flat, thin strip of adhesive backed bearing material (60) to the front side (62) of support plate side wall (42). Bearing strip (60) may be formed from plastic, metal or any other material having good bearing characteristics. One or more plastic bearing strips (60) may be affixed to the front side (62) of side wall (42) throughout the length thereof. It has been found that a single bearing strip (60) of sufficient length may be utilized. However, an individual bearing strip at the location of each pivot block (46) may be substituted for the single continuous strip.

As mentioned previously, the outer end (26) of closure assembly (20) must be capable of assuming the convex shape of an aircraft fuselage (28) in order to provide a weather tight sealing engagement with the aircraft. To this end, it has been found advantageous to provide at least one two piece vertical support tube (64) mounted pivotally on each side wall (42) of support plate (30) adjacent the outermost one piece vertical support tube (40). The two piece vertical support tubes (64) have rigid inner and outer ends (66 and 68) respectively which may be seen by referring to FIG. 2. The inner end of inner section (66) is mounted in a pivot block (46) which is pivotally connected to the support plate side wall (42) in the same manner as the one piece vertical support tube (40). Inner section (68) connects pivotally to outer section (68) by a hinge (70). While hinge (70) permits outer section (68) to pivot about a horizontal axis with respect to inner section (66), hinge (70) also acts to keep the inner and outer sections (66 and 68) in longitudinal alignment such that a curtain load imposed upon the outer section (68) may be transferred to the inner section (66) and from there to the side wall (42) of support plate (30). It should be noted that a bracket (72) attaches the outer end of inner section (66) to the adjacent one piece vertical support tube (40). Bracket (72) allows inner section (66) to move longitudinally with respect to its adjacent one piece outer tube (40) during pivotal movement of the two elements and maintains this section (66) substantially in the plane of the one piece tube (40).

A one piece horizontal support tube (80) attaches the outer ends of a one piece vertical support tube (40) on one side of support plate (30) with a one piece vertical support tube at a corresponding position on the opposite side of support plate (30) as may be seen by referring to FIG. 1. An identical one piece horizontal support tube (80) also connects the outer ends of the two piece vertical support tubes (64) located one on each side of support plate (30). A top corner joint (82) pivotally connects each end of one of the horizontal support tubes (80) to its respective vertical support tube (40 and 64). The top corner joint (82) while permitting pivotal movement about a vertical axis prevents lateral movement of the horizontal support tubes (80). A top corner joint (82) which fastens a horizontal support tube (80) to a one piece vertical support tube (40) may be seen in FIG. 4. A fitting (84) having a vertical bore (86) is attached to each end of a horizontal support tube (80). In the closure assembly (20) of the present invention fittings (84) are welded to the outer ends of the support tubes (80). However, they may be attached by any convenient method. A nonmetallic bushing (88) resides in each bore (86) to prevent corrosion caused by the electrolytic action of dissimilar metals. A fitting (90) having an axial threaded bore (92) is attached to the outer end of each of the one piece and two piece vertical support tubes (40 and 64). Fitting (90) may be attached to these tubes by welding or any other convenient method. Corner joint (82) is assembled by passing a non-clamping threaded fastener (94) sequentially through bore (86) of bushing (88) and an opening in an extreme motion restraint strap (96) into threaded bore (92). Subsequent to assembly, a horizontal support tube (80) may pivot about the vertical axis of the fastener (94) but is prevented from moving laterally with respect to the vertical support tubes (40 and 64).

As mentioned above, an extreme motion restraint strap (96) is clamped between the outer end of each horizontal support tube (80) and its respective vertical support tube (40 and 64). Looking to FIGS. 1 and 2, it may be observed that a pair of extreme motion restraint straps (96) extend between each of the corner joints (82) on opposite sides of the closure assembly (20). The inner end of each of the straps (96) attaches to the outer end (22) of cab (10). The extreme motion restraint straps are constructed from strips of a pliable material or fabric such as nylon and serve to limit the arcuate distance the corner joints (82) may pivot away from cab (10) when the closure assembly (20) has been extended to engage an aircraft fuselage (28). FIG. 2 illustrates the extreme motion restrain straps (96) fully extended with the top corner joints (82) at the end of their arcuate range of travel. FIG. 1 illustrates the extreme motion of restraint straps (96) gathered as the top corner joints (82) are moved together with the closure assembly (20) retracted against cab (10).

The frame (38) of closure assembly (20) also includes a pair of vertical front pad supports (100 and 102). These supports are constructed from a lightweight flexible steel plate. The pad supports (100 and 102) are attached at the bottom to the front edge (104) of support plate (30). Turning to FIG. 1 it may be observed that the vertical front pad support (100) is affixed to front edge (104) by a pair of threaded fasteners (106 and 108) whereas vertical front pad support (102) is affixed to front edge (104) with a single fastener (110). The pair of fasteners used in connection with pad support (100) enables that support to resist lateral motion and assist in stabilizing the front section of the closure. The single fastener used in conjunction with pad support (102) allows that support to have a degree of lateral motion which may be required where the convex curvature of an aircraft fuselage may taper in a longitudinal direction. Rigid fasteners (106-110) such as bolts are used to affix the pad supports (100 and 102) to the support plate (30) in place of hinges to eliminate the corrosion which has been found to occur in hinge type connections. In this instance the spring qualities of the thin steel plate enable the plate to bend uniformly in a longitudinal direction and eliminate the necessity of a hinge.

A front horizontal pad support (112) connects to the tops of each of the vertical front pad supports (100 and 102). Horizontal pad support (112) also is constructed from a lightweight flexible steel plate. Each of the pad supports (100, 102 and 112) are connected to the outer ends of the fabric curtain (114) as will be described hereinafter. Vertical pad supports (100 and 102) provide a backing for thick resilient aircraft engaging vertical pads (116 and 118). Similarly, horizontal pad support (112) provides a backing for a thick resilient aircraft engaging horizontal pad (120). The pads (116 through 120) engage an aircraft fuselage (28) to provide a weather tight seal therewith when the cab (10) of an aircraft passenger boarding bridge has been driven to cause bumper (32) to engage the fuselage of an aircraft along the bottom edge of a passenger doorway and the closure assembly (20) has been extended to overlie the fuselage in the area surrounding the doorway.

Figure 5:
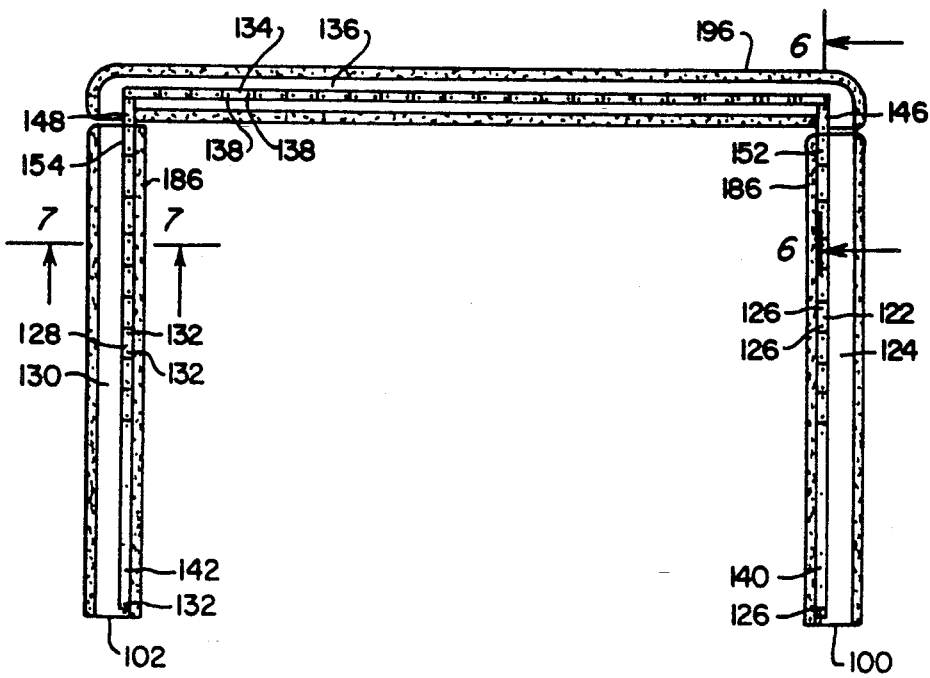
FIG. 5 is a rear view of the vertical pad supports and the horizontal pad support.
Figure 6:
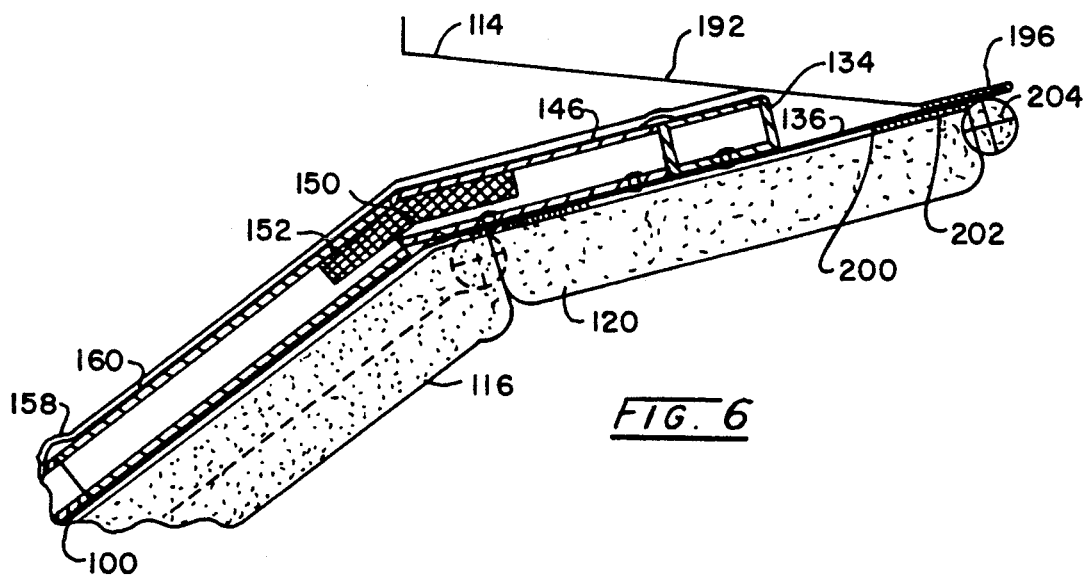
FIG. 6 is a view along line 6—6 of FIG. 5.

Referring to FIGS. 2, 5 and 6, it may be observed that a plurality of longitudinally extending negative curvature restraint blocks (122) are attached in columnar fashion to the rear face (124) of vertical pad support (100) by rivets (126). Similarly, a plurality of negative curvature restraint blocks (128) are attached in columnar fashion to the rear face (130) of vertical pad support (102) by rivets (132). From FIGS. 5 and 6 it may be seen that a plurality of negative curvature restraint blocks (134) also are affixed in longitudinal alignment to the rear face (136) of horizontal pad support (112) by rivets (138). The negative curvature restraint blocks on the vertical pad supports (100 and 102) differ from those on the horizontal pad support (112) in that the bottom-most negative curvature restraint block (140 and 142) in each of the columns on the vertical supports (100 and 102) have an extended length of approximately thirty-six inches compared to the remaining blocks which have a length of approximately six inches. The extended length blocks serve to increase the longitudinal rigidity of the inner ends of the vertical pad supports (100 and 102). No extended length blocks are needed for the horizontal pad support (112). It has been found desirable to mount the negative curvature restraint blocks (122, 128 and 134) with their longitudinal axis parallel to the longitudinal axis of the respective pad supports (100, 102 and 112). The reason for this resides in the fact that the blocks have considerably more strength in the longitudinal direction than in the lateral direction when placed in compression.

The columns of negative curvature restraint blocks (122 and 128) mounted on the vertical pad supports (100 and 102) are aligned such that the ends of adjacent blocks are in contact with each other when the pad supports (100 and 102) are straight and have no curvature. These blocks (122 and 128) function to stiffen the pad supports (100 and 102) and keep them straight when the closure curtain (20) is being retracted. In other words the blocks (122 and 128) prevent the pad supports (100 and 102) from having a negative curvature. At the same time, the negative curvature restraint blocks (122 and 128) do not prevent the pad supports (100 and 102) from assuming a positive curvature in which the outer ends curve around the fuselage (28) of an aircraft as depicted in FIG. 2. The negative curvature restraint blocks (134) on the rear face (136) of horizontal pad support (112) function to prevent the horizontal pad support from flexing convexly towards the aircraft and pulling the vertical pad supports (100 and 102) towards the center of the cab during retraction of the closure curtain (20).

The attachment of the horizontal pad support (112) to the tops of each of the vertical pad supports (100 and 102) may be seen by referring to FIGS. 5 and 6. It may be observed that a pair of lateral blocks (146 and 148) are mounted at each end of horizontal pad support (112) The longitudinal axis of the lateral blocks (146 and 148) are aligned with the columns of negative curvature restraint blocks (122 and 128) rigidly affixed to the vertical pad supports (100 and 102). The blocks (146 and 148) are arranged such that they extend beyond the lower edge of the horizontal pad support and overlie a portion of the top end of the vertical pad supports (100 and 102) respectively. Also, the blocks (146 and 148) are hollow as are the negative curvature restraint blocks (122, 128 and 134). A relatively stiff shear block (150) which may be formed from a stiff rubber material is mounted within each of the lateral blocks (146 and 148) and extends into the topmost negative curvature restraint block (152 and 154) at the outer ends of the pad supports (100 and 102) respectively. The shear blocks (150) serve to realign the horizontal pad support (112) with the vertical pad supports (100 and 102) when the cab is being retracted. They also permit the horizontal pad support (112) to pivot forwardly from the tops of the vertical pad supports (100 and 102) when the closure assembly (20) engages an aircraft.

Turning to FIG. 6, it may be observed that a positive curvature restraint strap (158) is affixed to the outer or top surface of each of the negative curvature restraint blocks (122 and 128) and the lateral blocks (146 and 148) formed on pad support (112). The curvature restraint straps (158) are attached to the columns of blocks (122 and 128) and the lateral blocks (146 and 148) by hook and pile fasteners (160). The hook and pile fasteners (160) enable the positive curvature restraint straps (158) to be adjusted easily. Typically, the closure assembly (20) would be extended to engage an aircraft and thereafter the positive curvature restraint straps (158) would be affixed to the top surfaces of the columns of negative curvature restraint blocks (122 and 128) and the lateral blocks (146 and 148). In this manner the positive curvature restraint straps (158) would limit the maximum positive curvature which could be assumed by the vertical pad supports (100 and 102) to that of the curvature of an aircraft fuselage serviced by the passenger boarding bridge.

A positive curvature restraint strap (162) illustrated in FIG. 2 also is affixed to the top surfaces of the negative curvature restraint blocks (134) mounted on horizontal pad support (112) by a hook and pile type fastener (164). The positive curvature restraint strap (164) functions to control the degree of flexure of pad support (112) convexly away from the aircraft. The flexure must be sufficient to enable the top of the curtain to conform to the contour of the aircraft fuselage but not sufficient to collapse the curtain by pulling the vertical pad supports (100 and 102) inwardly.

Thus, it may be seen that the columns of negative restraint blocks (122 and 128) keep the vertical pad supports (100 and 102) straight during retraction of closure assembly (20). The negative curvature restraint blocks (134) function similarly to maintain horizontal pad support (112) in a straight line orientation during retraction of closure assembly (20). The positive curvature restraint straps (158 and 162) function to limit the curvature of the vertical pad supports (100 and 102) and the horizontal pad support (112) to prevent the closure assembly (20) from collapsing.

Figure 4:
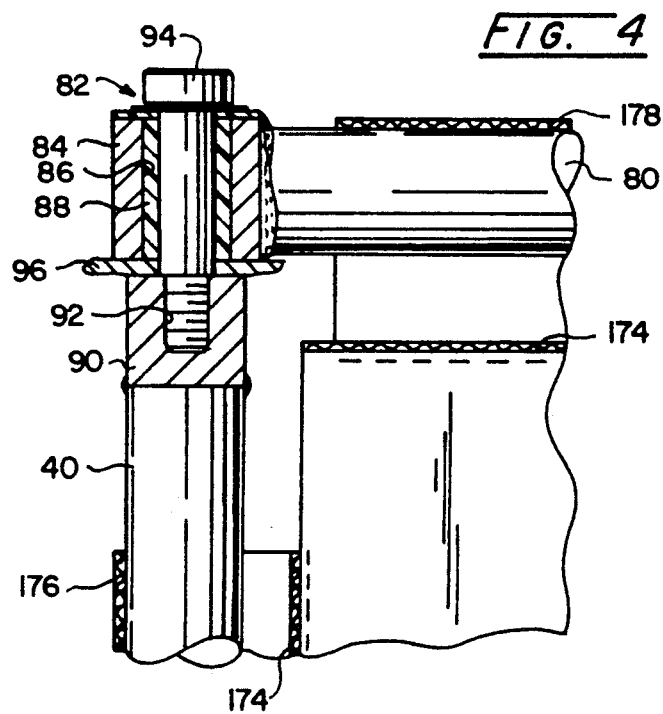
FIG. 4 is a part sectional view illustrating a corner joint which affixes a vertical support member to a horizontal support member.

Turning to FIGS. 1, 4 and 5, it may be observed that the fabric curtain (114) has an inner surface (172) and an outer surface (174) and mounts on the frame (38) of closure assembly (20) to provide an enclosure therefore. A plurality of longitudinally spaced vertical tube sleeves (176) are affixed to the outer surface (174) at the sides of the curtain (114) and a plurality of longitudinally spaced horizontal tube sleeves (178) are attached to the outer surface (174) at the top of curtain (114). The one and two piece vertical support tubes (40 and 64) of frame (38) are received within the vertical tube sleeves (176) whereas the one piece horizontal support tubes (80) are received within the horizontal tube sleeves (178). Consequently, the load of the fabric curtain (114) is transferred through the horizontal support tubes (80) to the one and two piece vertical support tubes (40 and 64) and into support plate (30). The tube sleeve construction of curtain (114) helps to define and reinforce the folds within the curtain and aids in having the curtain hold a definite shape with few wrinkles.

Figure 7:
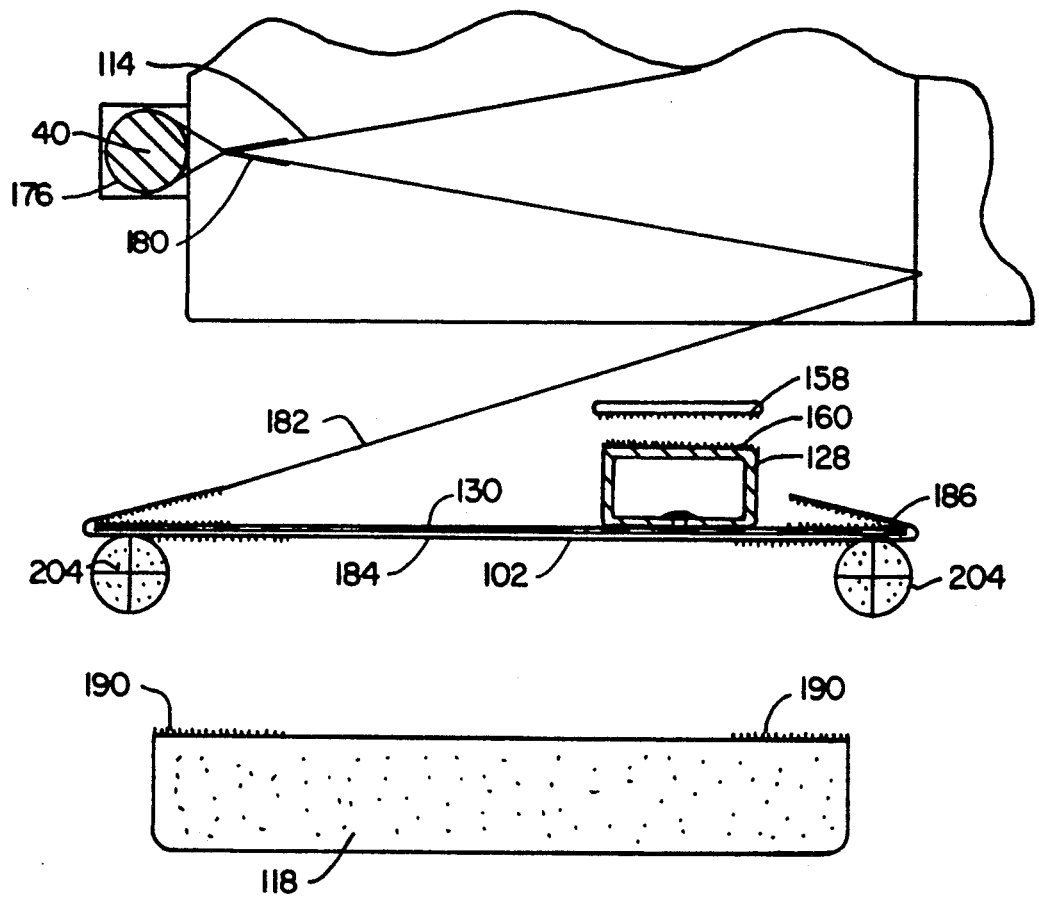
FIG. 7 is a view along line 7—7 of FIG. 5.

The tubular sleeves (176 and 178) form a joint (180) at the outer surface (174) of curtain (170) as may be seen by referring to FIG. 7. The joint (180) may be welded, sewn or a combination thereof. The outer ends (182) of the vertical bellows on each side of fabric curtain (114) wraps around the front faces (184) of each of the vertical pad supports (100 and 102) and attaches to the rear faces (124 and 130) thereof by a hook and pile fastener (186). Vertical pads (116 and 118) are attached to the front face (184) of the vertical pad supports (100 and 102) by a hook and pile fastener (190).

Turning to FIG. 6, it may be observed that the outer end (192) of the horizontal or top bellows of the fabric curtain (114) wraps around the horizontal pad support (112) and attaches to the rear face (136) of horizontal front pad support (112) by means of a hook and pile fastener (196). A horizontal pad (120) attaches to the front face (200) of horizontal pad support (112) by means of a plurality of hook and pile fasteners (202). A welting (204) defines the outer edges of the front face (184) of each of the vertical front pad supports (100 and 102) and the top outer edge of the front face of the horizontal front pad support (112). Welting (204) overlies the edges of the vertical and horizontal pad supports (100, 102 and 200) preventing any possible contact between the pad support edges with the skin of an aircraft.

Since certain changes may be made in the above-described system and apparatus without departing from the scope of the invention herein involved, it is intended that all matter contained in the description or shown in the accompanying drawings shall be interpreted as illustrative and not in a limiting sense.

We claim:

1. A closure for a cab forming a longitudinally extending passageway that connects a passenger loading bridge to a doorway formed in the fuselage of an aircraft which comprises:
   a support plate having a pair of laterally spaced side walls;
   a plurality of longitudinally spaced pairs of rigid vertical support members having inner and outer ends;
   pivot means for pivotally connecting the inner ends of said vertical support members to said side walls;
   a plurality of rigid horizontal support members which extend between the outer ends of said pairs of vertical support members;
   attachment means for attaching the ends of said horizontal support members to said outer ends of said vertical support members such that said pairs of vertical support members and said horizontal support members form a curtain frame;
   a curtain having an inner side surface and an outer side surface; and
   a plurality of longitudinally spaced laterally extending sleeves formed on the outer surface of said curtain adapted to receive said pairs of vertical support members and said horizontal support members such that said curtain is suspended from said horizontal support members between said pairs of vertical support members.

2. The closure of claim 1 in which said attachment means includes second pivot means for pivotally connecting said horizontal members to said outer ends about a vertical axis; and wherein said attachment means operates to prevent lateral movement of said horizontal members.

3. The closure of claim 1 in which said attachment means is detachable to enable said horizontal support members to be detached from said vertical support members.

4. The closure of claim 1 in which the first said pivot means includes a plurality of rigid pivot blocks each of which receives said inner end of one of said vertical support tubes and a plurality of fasteners each of which pivotally connects one of said pivot blocks to said support plate side wall for movement about a horizontal axis.

5. The closure of claim 4 further including two strips of adhesive backed bearing material having an adhesive on one side and a bearing material on the other side, said adhesive sides being attached one to each of said support plate side walls with said bearing material interposed between said pivot block and said side wall.

6. The closure of claim 1 further comprising restraint means connected to the outer ends of said vertical support members to limit the pivotal movement of the outer ends.

7. A closure for a cab forming a longitudinally extending passageway that connects a passenger loading bridge to a doorway formed in the fuselage of an aircraft which comprises:
 a support plate having a pair of laterally spaced side walls;
 a plurality of longitudinally spaced pairs of rigid vertical support members having inner and outer ends;
 a pair of segmented vertical support members positioned one on each side of said support plate;
 each of said segmented vertical support members having an inner segment pivotally connected to an outer segment;
 pivot means for pivotally connecting the inner ends of said rigid vertical support members and the inner ends of said inner segments to said side walls;
 wherein said segmented vertical support members are positioned at the aircraft end of said support plate;
 a plurality of rigid horizontal support members which extend between the outer ends of said rigid pairs of vertical support members and the outer ends of said outer segments;
 attachment means for attaching the ends of said horizontal support members to said outer ends of said rigid vertical support members and the outer ends of said outer segments;
 a curtain having an inner side surface and an outer side surface; and
 a plurality of longitudinally spaced laterally extending sleeves formed on the outer surface of said curtain adapted to receive said pairs of rigid and said segmented vertical support members and said horizontal support members such that said curtain is suspended from said horizontal support members between said pairs of said rigid and segmented vertical support members.

8. The closure of claim 7 in which said attachment means includes second pivot means for pivotally connecting said horizontal members to said outer ends about a vertical axis; and
 wherein said attachment means operates to prevent lateral movement of said horizontal members.

9. The closure of claim 7 in which said attachment means is detachable to enable said horizontal support members to be detached from said rigid and said segmented vertical support members.

10. The closure of claim 7 in which the first said pivot means includes a plurality of rigid pivot blocks of which each receives said inner end of one of said rigid and segmented vertical support tubes and a plurality of fasteners one of which pivotally connects each of said pivot blocks to said support plate side wall for movement about a horizontal axis.

11. The closure of claim 10 further comprising two strips of adhesive backed bearing material each having an adhesive on one side and a bearing material on the opposite side, said adhesive side being attached each to one of said support plate side walls with said bearing material side interposed between said pivot blocks and said side walls.

12. The closure of claim 7 further comprising connecting means for connecting each of said segmented vertical support members to its adjacent rigid vertical support member.

13. The closure of claim 7 further comprising restraint means connected to one outer ends of said vertical support members to limit the pivotal movement of these outer ends.

14. A closure for a cab forming a longitudinally extending passageway that connects a passenger loading bridge to a doorway formed in the fuselage of an aircraft and movable between a retracted position in which the outer end of said closure is moved toward said bridge and an extended position in which said outer end of said closure is moved away from said bridge and has a positive curvature which substantially complements that of the fuselage of an adjacent aircraft which comprises:
 a support plate having a pair of laterally spaced side walls;
 a plurality of longitudinally spaced pairs of rigid vertical support members having inner and outer ends;
 a pair of segmented vertical support members positioned one on each side of said support plate;
 each of said segmented vertical support members having an inner segment pivotally connected to an outer segment;
 a pair of longitudinally flexible vertical pad supports having inner and outer ends positioned one on each side of said support plate;
 pivot means for pivotally connecting the inner ends of said rigid vertical support members to said side walls;
 first connecting means for connecting the inner ends of said vertical pad supports to said support plate;
 second connecting means for connecting the inner ends of said inner segments to said side walls;
 wherein said vertical pad supports are positioned at the aircraft end of said support plate and said segmented vertical support members are positioned between said rigid vertical support members and said pad support;
 a plurality of rigid horizontal support members which extend between the outer ends of said rigid pairs of vertical support members and the outer ends of said outer segments;
 attachment means for attaching the ends of said horizontal support members to said outer ends of said rigid vertical support members and the outer ends of said outer segments;
 a longitudinally flexible horizontal pad support which extends between the outer ends of said vertically pad supports;
 a curtain having an inner side surface and an outer side surface;
 a plurality of longitudinally spaced laterally extending sleeves formed on the outer surface of said curtain adapted to receive said pairs of rigid and said segmented vertical support members and said horizontal support members such that said curtain is suspended from said horizontal support members between said pairs of said rigid and said segmented vertical support members;

first fastening means for fastening said curtain to said vertical pad supports; and second fastening means for fastening said curtain to said horizontal pad support.

15. The closure of claim 14 in which said attachment means includes second pivot means for pivotally connecting said horizontal members to said outer ends about a vertical axis; and wherein said attachment means operates to prevent lateral movement of said horizontal members.

16. The closure of claim 14 in which said attachment means is detachable to enable said horizontal support members to be detached from said rigid and said segmented vertical support members.

17. The closure of claim 14 in which the first said pivot means includes a plurality of rigid pivot blocks of which each receives said inner end of one of said rigid and segmented vertical support tubes and a plurality of fasteners one of which pivotally connects each of said pivot blocks to said support plate side wall for movement about a horizontal axis.

18. The closure of claim 14 further comprising connecting means for connecting each of said segmented vertical support members to its adjacent rigid vertical support member such that each of said inner segments pivots with its adjacent vertical support member.

19. The closure of claim 14 further comprising two strips of adhesive backed bearing material each having an adhesive on one side and a bearing material on the opposite side, said adhesive side being attached each to one of said support plate side walls with said bearing material side interposed between said pivot blocks and said side wall.

20. The closure of claim 14 further comprising restraint means connected to the outer ends of said vertical support members to limit the pivotal movement of these outer ends when said closure is in said extended position.

21. The closure of claim 14 in which said vertical pad supports are formed from a single piece of metal which may be flexed in a longitudinal direction but resists flexing in a lateral direction.

22. The closure of claim 14 in which the inner end of at least one of said vertical pad supports is rigidly affixed to said support plate.

23. The closure of claim 14 in which said vertical pad supports are formed from a plurality of segments which are hinged together to provide a support which may be flexed in a longitudinal direction but resists flexing in a lateral direction.

24. The closure of claim 14 in which said first fastening means includes a hook and loop type fastener in which one of said hook or said loop is attached to said vertical pad supports and the other of said hook or said loop is attached to said curtain.

25. The closure of claim 14 in which said second fastening means includes a hook and loop type fastener in which one of said hook or said loop is attached to said horizontal pad support and the other of said hook or said loop is attached to said curtain.

26. The closure of claim 14 further comprising two sets of negative curvature restraint blocks attached one set to each of said vertical pad supports; each set of blocks extending from one end of said vertical pad support to the other end thereof; said blocks in each set being aligned such that one edge of each block is in contact with an edge of an adjacent block when said closure is in said retraced position and said vertical pad support is unflexed and extend substantially in a straight line to prevent said support from flexing in negative direction towards said bridge; and said edges of adjacent blocks are disengaged when said closure is in said extended position and said vertical pad support is flexed in a positive direction away from said bridge.

27. The closure of claim 26 further comprising a pair of positive curvature restraint straps; third fastening means for fastening one strap to each of said negative curvature restraint blocks on one of said vertical pad supports to limit the maximum curvature of said pad supports in a positive direction when said support is flexed in a positive direction.

28. The closure of claim 27 in which said third fastening means includes adjustment means for adjusting the length of said positive curvature restraint straps to provide the proper maximum curvature of said pad supports in a positive direction to enable said closure to accommodate different sized aircraft fuselages.

29. The closure of claim 26 further comprising a pair of negative restraint blocks affixed one to each end of said horizontal pad support and in alignment with the set of negative restraint blocks on one of said vertical pad supports; and resilient alignment means for connecting each of said end blocks on said horizontal pad support to the adjacent block at the end of a vertical pad support to limit the movement of the ends of said horizontal pad support with respect the outer ends of the vertical pad supports.

30. The closure of claim 26 further comprising a plurality of negative curvature restraint blocks attached to said horizontal pad support and aligned such that one edge of each block is in contact with an edge of an adjacent block when said closure is in said retracted position and said horizontal pad support is unflexed and extend substantially in a straight line to prevent one end of said horizontal support form flexing in a negative direction towards said bridge and said edge of adjacent blocks are separated when said closure is in said extended position and one end of said horizontal pad support is flexed in a positive direction away from said bridge.

31. The closure of claim 26 further comprising a horizontal positive curvature restraint strap; fourth fastening means for fastening said strap to each of said negative curvature restraint blocks on one of said horizontal pad support to limit the maximum curvature of said pad support in a positive direction.

32. The closure of claim 31 in which said fourth fastening means includes adjustment means for adjusting the length of said horizontal positive curvature restraint strap to provide the proper maximum curvature of said horizontal pad support in a positive direction to enable said closure to accommodate different sized aircraft fuselages.

33. The closure of claim 26 further comprising a vertical pad detachably attached to each of said vertical pad supports and a horizontal pad detachably attached to said horizontal pad support.

* * * * *